United States Patent
Dei

(10) Patent No.: US 8,290,063 B2
(45) Date of Patent: Oct. 16, 2012

(54) MOVING IMAGE DATA CONVERSION METHOD, DEVICE, AND PROGRAM

(75) Inventor: Hiroaki Dei, Tokyo (JP)

(73) Assignee: NEC Corporation, Tokyo (JP)

( * ) Notice: Subject to any disclaimer, the term of this patent is extended or adjusted under 35 U.S.C. 154(b) by 1275 days.

(21) Appl. No.: 10/570,306

(22) PCT Filed: Aug. 19, 2004

(86) PCT No.: PCT/JP2004/011886
§ 371 (c)(1),
(2), (4) Date: Apr. 28, 2006

(87) PCT Pub. No.: WO2005/025225
PCT Pub. Date: Mar. 17, 2005

(65) Prior Publication Data
US 2007/0019725 A1    Jan. 25, 2007

(30) Foreign Application Priority Data

Sep. 4, 2003    (JP) ................................. 2003-313055

(51) Int. Cl.
*H04N 7/12* (2006.01)
*H04N 11/02* (2006.01)
*H04N 11/04* (2006.01)

(52) U.S. Cl. .................................................. 375/240.25

(58) Field of Classification Search .............. 375/240.25
See application file for complete search history.

(56) References Cited

U.S. PATENT DOCUMENTS

| | | | |
|---|---|---|---|
| 5,528,284 A | 6/1996 | Iwami et al. | |
| 6,463,101 B1 | 10/2002 | Koto | |
| 6,480,537 B1 * | 11/2002 | Agrawal et al. | 375/240 |
| 6,560,282 B2 | 5/2003 | Tahara et al. | |
| 6,947,448 B2 | 9/2005 | Tomita | |
| 2001/0038649 A1 * | 11/2001 | Hagai et al. | 370/536 |
| 2002/0003799 A1 * | 1/2002 | Tomita | 370/392 |
| 2003/0026342 A1 * | 2/2003 | Horiike et al. | 375/240.25 |
| 2003/0128766 A1 * | 7/2003 | Tahara et al. | 375/240.26 |

FOREIGN PATENT DOCUMENTS

| | | |
|---|---|---|
| CN | 1241095 A | 1/2000 |
| JP | 6-237451 A | 8/1994 |
| JP | 9-18881 A | 1/1997 |
| JP | 11-275583 A | 10/1999 |
| JP | 2000-59788 A | 2/2000 |
| JP | 2001-320413 A | 11/2001 |

* cited by examiner

*Primary Examiner* — David Czekaj
*Assistant Examiner* — Chikaodili E Anyikire
(74) *Attorney, Agent, or Firm* — Sughrue Mion, PLLC

(57) ABSTRACT

In distributing moving image data, it is an object to make it possible to start reproduction, not only from the head of the moving image data, but also from any desired position and to minimize an increase in the amount of the processing. A moving image data conversion device (1) comprises moving image data receiving means (2) for receiving moving image data (6), decoder configuration information saving means (3) for retrieving and holding decoder configuration information included in the moving image data (6) to define a condition for decoding the moving image data (6), decoder configuration information inserting means (4) for inserting the decoder configuration information into a plurality of predetermined positions in the moving image data (6) to generate moving image data, and moving image data output means (5) for outputting the generated moving image data as moving image data (8).

2 Claims, 15 Drawing Sheets

FIG. 5
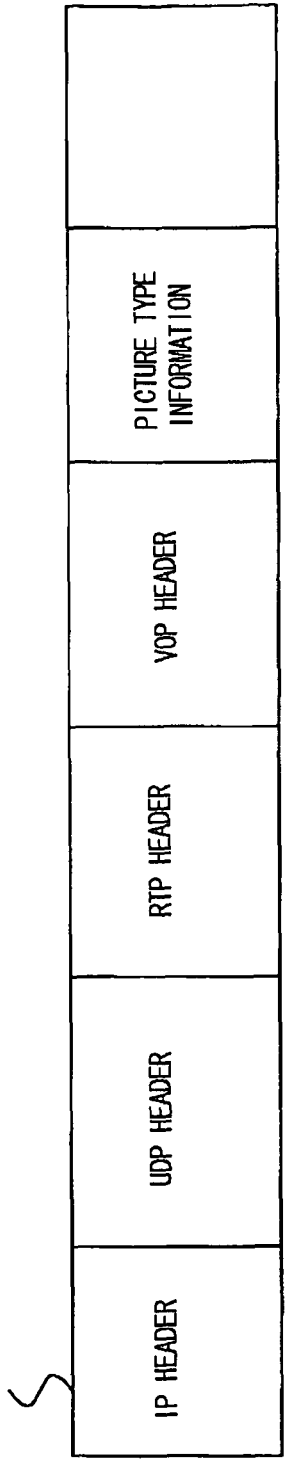
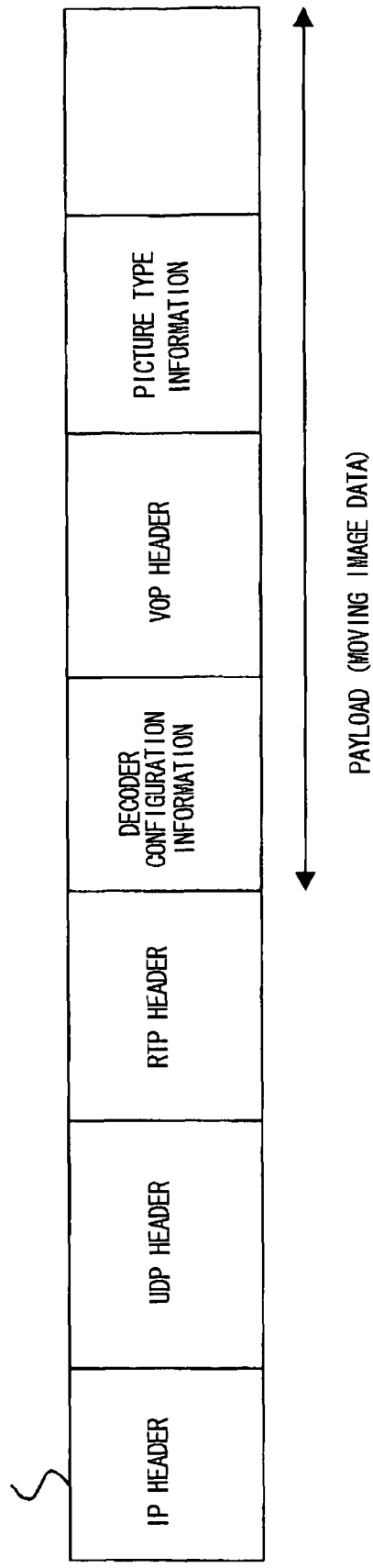

FIG. 10
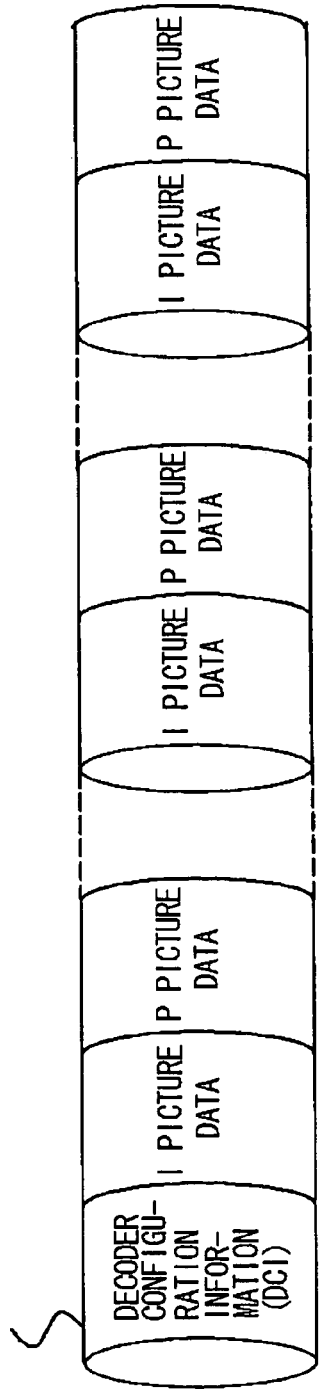
51: INPUT MOVING IMAGE DATA FILE
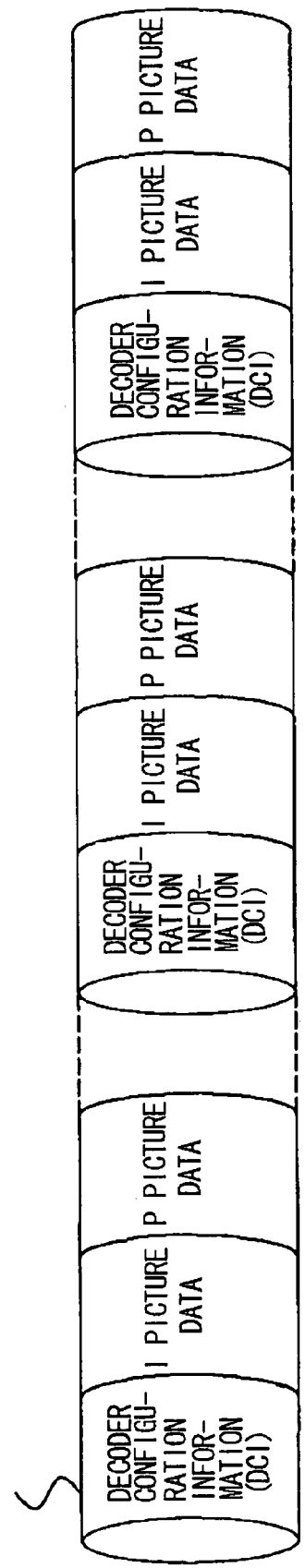
52: OUTPUT MOVING IMAGE DATA FILE

MOVING IMAGE DATA CONVERSION METHOD, DEVICE, AND PROGRAM

This application claims priority from PCT Application No. PCT/JP2004/011886 filed Aug. 19, 2004 and from Japanese Application No. 2003-313055 filed Sep. 4, 2003, which applications are incorporated herein by reference.

TECHNICAL FIELD

The present invention relates to a moving image data conversion method, device, and program for decoding coded moving image data from any desired position.

BACKGROUND ART

Recently, methods for transmitting coded data, compressed efficiently based on inter-frame prediction, are used as a method for efficiently transmitting moving image data in many cases. Those methods encode prediction parameters and predictive residual images, obtained by predicting coded images from the temporally preceding and following frames, to reduce the information amount of moving image data that has a high time correlation. In addition, those methods efficiently compress predictive residual image data through transform coding or quantization to enable the transmission of moving image data at a narrow transmission band.

Typical examples of those methods are those using compress and encode methods such as MPEG (Moving Picture Experts Group)-1, MPEG-2, and MPEG-4. Those compress and encode methods perform inter-frame prediction for input image frames through motion compensation on a basis of a fixed-size rectangular area unit, called a macro block, and perform variable-length coding for the obtained motion vector and the signal data compressed by executing two-dimensional discrete cosine transform and quantization for the predictive residual image data.

There are many methods for distributing moving image data, obtained by the compression described above, to an IP (Internet Protocol) network that uses the packet switching method and it is expected that the IP-based distribution of moving images will also become popular on wireless transmission lines.

There are a file download method and a streaming method for distributing such moving image data. In the file download method, all of a predetermined file is distributed and then reproduced. When transmitting via a wireless transmission line, the file download method is employed in many cases to allow an action to be taken against a wireless error or loss that may be generated. On the other hand, because it takes long for the file download method to start reproducing moving images, the streaming method that can start reproduction before completely receiving moving image data is also used.

However, in the file download method, it is basically required that the download be started, not from a moving image data part requested by the user, but from the start of the file. In the streaming method, too, the reception and reproduction of moving image data from any desired position cannot be started or limited in some cases if there are continuous inter-frame coded frames.

Therefore, to decode and reproduce moving image data from any desired position, the sending side sends moving image data in which intra-frame coded data is inserted between inter-frame coded data at an appropriate time interval. A technology is also developed for use on the receiving side to divide received moving image data into multiple files and record them and to decode and reproduce the moving image data from an intra-frame coded data position included in the data read from any desired file of the files (for example, Patent Document 1).

Another known method is that, when an intra-frame coded frame is inserted at an interval of a predetermined frame period and a random access point is set, a new intra-frame coded frame is inserted and an intra-frame coded frame in the immediately preceding frame period is replaced by an inter-frame coded frame before coding (for example, Patent Document 2).

Patent Document 1: Japanese Patent Kokai Publication No. JP-A-9-18881 (FIG. 1)

Patent Document 2: Japanese Patent Kokai Publication No. JP-A-11-275583 (FIGS. 3 and 8)

DISCLOSURE OF THE INVENTION

Problems to be Solved by the Invention

To decode moving images, the reproduction side must know the decode condition, and the decode condition is defined by the decoder configuration information usually written at the head of moving image data. That is, except the case where the moving image coding method is uniquely defined, the reproduction side reads the decoder configuration information to find the decoding condition and reproduces the moving image data. In the prior art, though an intra-frame coded frame is positioned at a predetermined position to allow the reproduction of moving image to be started from any desired position, the decoder configuration information is not disclosed at all. Therefore, simply including an intra-frame coded frame is not enough to allow the reproduction to be started from any desired position. In addition, the prior art requires the encoding operation for generating an intra-frame coded frame and there is a possibility that the encoding operation increases the processing amount during moving image data conversion.

The present invention aims at solving the problems described above, and it is an object of the present invention to provide a method, a device, and a program for starting reproduction from any desired position in moving images (or pictures).

It is another object of the present invention to provide a method, a device, and a program for reducing the amount of the conversion processing of moving image data.

Means to Solve the Problems

To achieve the object described above, in a first aspect, a moving image data conversion method according to the present invention comprises a step of receiving first moving image data; and a step of holding decoder configuration information included in the first moving image data to define a condition for decoding the first moving image data. The moving image data conversion method further comprises a step of inserting the decoder configuration information into a plurality of predetermined positions in the first moving image data to generate second moving image data; and a step of outputting the second moving image data.

In a second aspect, a moving image data conversion method according to the present invention comprises a step of receiving first moving image data; a step of transcoding the first moving image data to generate second moving image data, wherein decoder configuration information, included in the first moving image data to define a condition for decoding the first moving image data is changed to decoder configuration information to define a condition for decoding the second moving image data followed by generating the second moving image data in such a way that the changed decoder configuration information is included in a plurality of predetermined positions in the second moving image data; and a step of outputting the second moving image data.

In a third aspect, a moving image data conversion device according to the present invention comprises receiving means for receiving first moving image data; and decoder configuration information saving means for holding decoder configuration information included in the first moving image data to define a condition for decoding the first moving image data. The moving image data conversion device further comprises decoder configuration information inserting means for inserting the decoder configuration information into a plurality of predetermined positions in the first moving image data to generate second moving image data; and output means for outputting the second moving image data.

In a fourth aspect, a moving image data conversion device according to the present invention comprises receiving means for receiving first moving image data; transcoding means, for use when the first moving image data is transcoded to generate second moving image data, for changing decoder configuration information, included in the first moving image data to define a condition for decoding the first moving image data, to decoder configuration information to define a condition for decoding the second moving image data, followed by generating the second moving image data in such a way that the changed decoder configuration information is included in a plurality of predetermined positions in the second moving image data; and output means for outputting the second moving image data.

In a fifth aspect, a moving image data distribution device according to the present invention comprises means for receiving selection information on moving image data to be transmitted, transmission start position information, and transmission destination information on the moving image data from an external device; receiving means for retrieving a part, determined based on the transmission start position information, from moving image data selected according to the selection information and for receiving the part as first moving image data; decoder configuration information saving means for holding decoder configuration information included in the first moving image data to define a condition for decoding the first moving image data; decoder configuration information inserting means for inserting the decoder configuration information into a plurality of predetermined positions in the first moving image data to generate second moving image data; and means for transmitting the second moving image data to a destination determined based on the transmission destination information.

In a sixth aspect, a moving image data distribution device according to the present invention comprises means for receiving selection information on moving image data to be transmitted, transmission start position information, and transmission destination information on the moving image data from a external device; receiving means for retrieving a part, determined based on the transmission start position information, from moving image data selected according to the selection information and receiving the part as first moving image data; transcoding means, for use when the first moving image data is transcoded to generate second moving image data, for changing decoder configuration information, included in the first moving image data to define a condition for decoding the first moving image data, to decoder configuration information to define a condition for decoding the second moving image data, followed by generating the second moving image data in such a way that the changed decoder configuration information is included in a plurality of predetermined positions in the second moving image data; and means for transmitting the second moving image data to a destination determined based on the transmission destination information.

In a seventh aspect, a moving image data reproduction device according to the present invention comprises receiving means for receiving first moving image data; decoder configuration information saving means for holding decoder configuration information included in the first moving image data to define a condition for decoding the first moving image data; decoder configuration information inserting means for inserting the decoder configuration information into a plurality of predetermined positions in the first moving image data to generate second moving image data; and means for decoding and reproducing the generated second moving image data.

In an eighth aspect, a moving image data reproduction device according to the present invention comprises receiving means for receiving first moving image data; transcoding means, for use when the first moving image data is transcoded to generate second moving image data, for changing decoder configuration information, included in the first moving image data to define a condition for decoding the first moving image data, to decoder configuration information to define a condition for decoding the second moving image data, followed by generating the second moving image data in such a way that the changed decoder configuration information is included in a plurality of predetermined positions in the second moving image data; and means for decoding and reproducing the generated second moving image data.

In a ninth aspect, a program according to the present invention causes a computer, which configures a moving image data conversion device, to perform the following steps comprising: receiving first moving image data; and holding decoder configuration information included in the first moving image data to define a condition for decoding the first moving image data. The program further causes the computer to insert the decoder configuration information into a plurality of predetermined positions in the first moving image data to generate second moving image data; and output the second moving image data.

In a tenth aspect, a program according to the present invention causes a computer, which configures a moving image data conversion device, to perform the following steps comprising: receiving first moving image data; when the first moving image data is transcoded to generate second moving image data, change decoder configuration information, included in the first moving image data to define a condition for decoding the first moving image data, to decoder configuration information to define a condition for decoding the second moving image data, followed by generating the second moving image data in such a way that the changed decoder configuration information is included in a plurality of predetermined positions in the second moving image data; and outputting the second moving image data.

In an eleventh aspect, a program according to the present invention causes a computer, which configures a moving image data reproduction device, to perform the following steps comprising: receiving first moving image data; holding decoder configuration information included in the first moving image data to define a condition for decoding the first moving image data; inserting the decoder configuration information into a plurality of predetermined positions in the first moving image data to generate second moving image data; and decoding and reproduce the generated second moving image data.

In a twelfth aspect, a program according to the present invention causes a computer, which configures a moving image data reproduction device, to perform the following steps comprising: receiving first moving image data; transcoding the first moving image data is transcoded to generate second moving image data, change decoder configuration information, included in the first moving image data to define a condition for decoding the first moving image data, to decoder configuration information to define a condition for decoding the second moving image data, followed by generating the second moving image data in such a way that the changed decoder configuration information is included in a plurality of predetermined positions in the second moving image data; and decoding and reproducing the generated second moving image data.

Meritorious Effect of the Invention

According to the present invention, because moving image data is generated with the decoder configuration information inserted into predetermined multiple positions in the moving image data during the conversion of the moving image data as described above, the moving image data can be decoded not only from the start of the moving image data but also from any desired position.

According to the present invention, because moving image data is generated with the decoder configuration information inserted into predetermined multiple positions in the moving image data during the conversion of the moving image data, the amount of processing required for the conversion can be reduced.

BRIEF DESCRIPTION OF THE DRAWINGS

FIG. 5 is a diagram showing the structure of a moving image data packet that is transmitted.

FIG. 10 is a diagram showing the structure of moving image data before and after conversion in the fourth embodiment.

Figure 1:
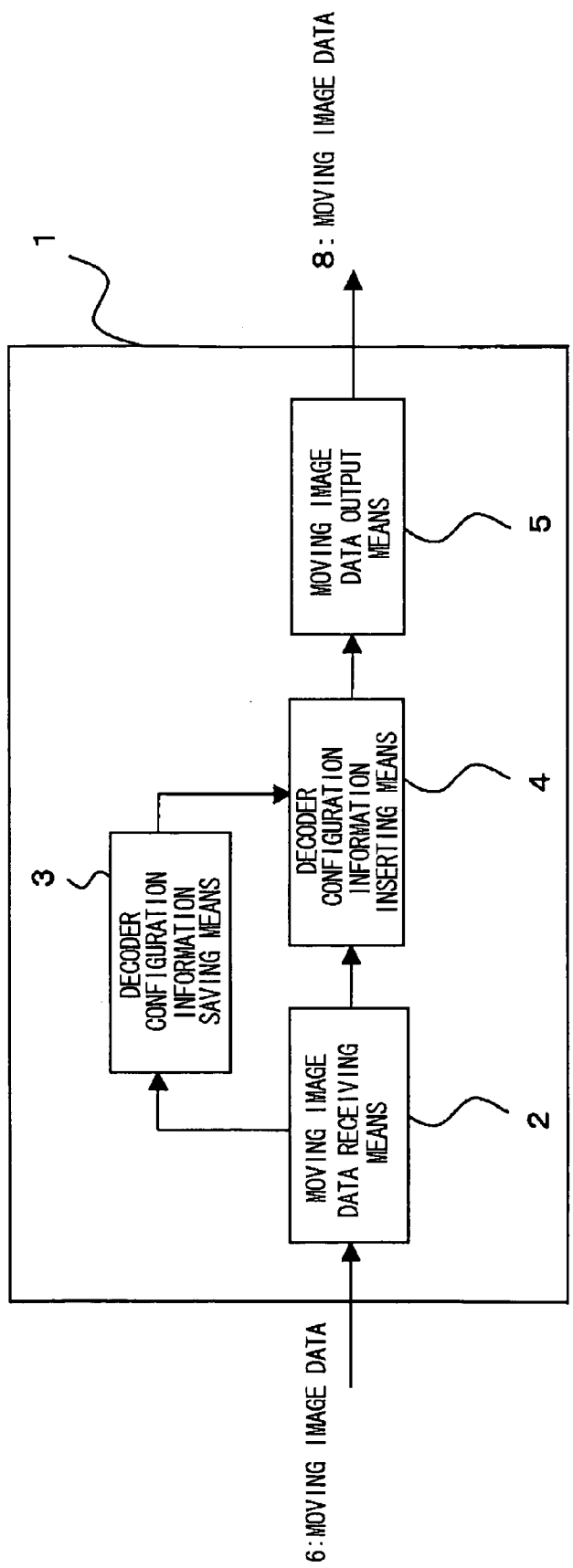
FIG. 1 is a block diagram showing the main part of a moving image data conversion device in an embodiment of the present invention.

EXPLANATION OF NUMERALS 1, 20, 20b, 20c, 20d, 20e, 20f, 20g, 20i moving image data conversion device
2 moving image data receiving means
3 decoder configuration information saving means
4 decoder configuration information inserting means
5 moving image data output means
6, 8 moving image data
7 decoder configuration information
10 moving image data distribution device
11 moving image data accumulation generation unit
12 moving image data transmission unit
13, 21, 21c, 21f, 31, 31h connection call processing unit
22, 22c moving image data reception unit
23, 23a, 23c decoder configuration information saving unit
24 decoder configuration information insertion unit
25 moving image data transmission unit
26 moving image data transcoding unit
27d, 27e, 27f, 27g moving image data file reading unit
28 moving image data file writing unit
30, 30h moving image data reproduction device
32 moving image data reception unit
33, 33h decoder
40 transmission line
51 input moving image data file
52 output moving image data file
101 received moving image data packet
102 transmission moving image data packet

BEST MODE FOR CARRYING OUT THE INVENTION

A moving image data conversion method, device, system, and computer program in a first embodiment of the present invention comprises, on the moving image data distribution side, A) means for selecting moving image data, which will be distributed, according to connection call processing or a predetermined method and B) means for sending the moving image data according to the connection call processing or a predetermined method; on the moving image data conversion side, A) means for receiving moving image data according to connection call processing or a predetermined method, B) means for saving decoder configuration information (DCI) included in a specific position in the moving image data or the corresponding header information, C) means for inserting the decoder configuration information in predetermined positions in the received moving image data, and D) means for sending the moving image data according to the connection call processing or a predetermined method; and, on the moving image data reproduction side, A) means for receiving moving image data according to connection call processing or a predetermined method and B) means for decoding and reproducing the moving image data.

A moving image data conversion method, device, system, and computer program in a second embodiment of the present invention comprises, on the moving image data distribution side, A) means for selecting moving image data, which will be distributed, according to connection call processing or a predetermined method and B) means for sending the moving image data according to the connection call processing or the predetermined method; on the moving image data conversion side, A) means for receiving moving image data according to connection call processing or a predetermined method, B) means for transcoding the received moving image data in such a way that decoder configuration information (DCI) or the corresponding header information is included in specific positions in the moving image data, and C) means for sending the moving image data according to the connection call processing or a predetermined method; and, on the moving image data reproduction side, A) means for receiving moving image data according to connection call processing or a predetermined method and B) means for decoding and reproducing the moving image data.

A moving image data conversion method, device, system, and computer program in a third embodiment of the present invention comprises, on the moving image data distribution side, A) means for selecting moving image data, which will be distributed, according to connection call processing or a predetermined method and B) means for sending the moving image data according to the connection call processing or the predetermined method; on the moving image data conversion side, A) means for receiving moving image data according to connection call processing or a predetermined method, B) means for saving decoder configuration information (DCI) included in the connection call processing or the corresponding header information, C) means for inserting the decoder configuration information in predetermined positions of the received moving image data, and D) sending the moving image data according to the connection call processing or the predetermined method; and, on the moving image data reproduction side, A) means for receiving moving image data according to connection call processing or a predetermined method and B) means for decoding and reproducing the moving image data.

A moving image data conversion method, device, system, and computer program in a fourth embodiment of the present invention comprises, on the moving image data conversion side, A) means for reading a moving image data file, B) means for extracting and saving decoder configuration information (DCI) or the corresponding header information included in the moving image data file, C) means for inserting the decoder configuration information in predetermined positions in the moving image data that is read, and D) means for writing the moving image data, in which the decoder configuration information is inserted in the predetermined positions, as a file.

A moving image data conversion method, device, system, and computer program in a fifth embodiment of the present invention comprises, on the moving image data conversion side, A) means for reading a moving image data file, B) means for transcoding the moving image data in such a way that decoder configuration information (DCI) or the corresponding header information is included in specific positions in the moving image data that is read, and C) means for writing the moving image data, in which the decoder configuration information is inserted in the predetermined positions, as a file.

A moving image data conversion method, device, system, and computer program in a sixth embodiment of the present invention comprises, on the moving image data conversion side, A) means for reading a moving image data file, B) means for extracting and saving decoder configuration information (DCI) or the corresponding header information included in the moving image data file, C) means for inserting the decoder configuration information in predetermined positions in the moving image data that is read, and D) sending the moving image data according to connection call processing or a predetermined method; and, on the moving image data reproduction side, A) means for receiving moving image data according to connection call processing or a predetermined method and B) means for decoding and reproducing the moving image data.

A moving image data conversion method, device, system, and computer program in a seventh embodiment of the present invention comprises, on the moving image data conversion side, A) means for reading a moving image data file, B) means for transcoding the moving image data in such a way that decoder configuration information (DCI) or the corresponding header information is included in specific positions in the moving image data that is read, and C) means for sending the moving image data according to connection call processing or a predetermined method; and, on the moving image data reproduction side, A) means for receiving moving image data according to connection call processing or a predetermined method and B) means for decoding and reproducing the moving image data.

A moving image data conversion method, device, system, and computer program in an eighth embodiment of the present invention comprises, on the moving image data distribution side, A) means for selecting moving image data, which will be distributed, according to connection call processing or a predetermined method and B) means for sending the moving image data according to the connection call processing or the predetermined method; and, on the moving image data reproduction side, A) means for receiving moving image data according to connection call processing or a predetermined method, B) means for saving decoder configuration information (DCI) or the corresponding header information included in the connection call processing, C) means for inserting the decoder configuration information in predetermined positions in the received moving image data, and D) means for decoding and reproducing the moving image data.

A moving image data reproduction method, device, system, and computer program in a ninth embodiment of the present invention comprises, on the moving image data reproduction side, A) means for reading a moving image data file, B) means for extracting and saving decoder configuration information (DCI) or the corresponding header information included in the moving image data file, C) means for inserting the decoder configuration information in predetermined positions in the moving image data that is read, and D) means of decoding and reproducing the moving image data.

Next, the principle of converting moving image data, which is the main part of the present invention, will be described. FIG. 1 is a block diagram showing the main part of a moving image data conversion device in an embodiment of the present invention. Referring to FIG. 1, a moving image data conversion device 1 comprises moving image data receiving means 2 for receiving moving image data 6, decoder configuration information saving means 3 for retrieving and holding decoder configuration information included in the moving image data 6 and defining the condition for decoding the moving image data 6, decoder configuration information inserting means 4 for inserting the decoder configuration information into predetermined multiple positions in the moving image data 6 for generating moving image data, and moving image data output means 5 for outputting the generated moving image data as moving image data 8.

Figure 2:
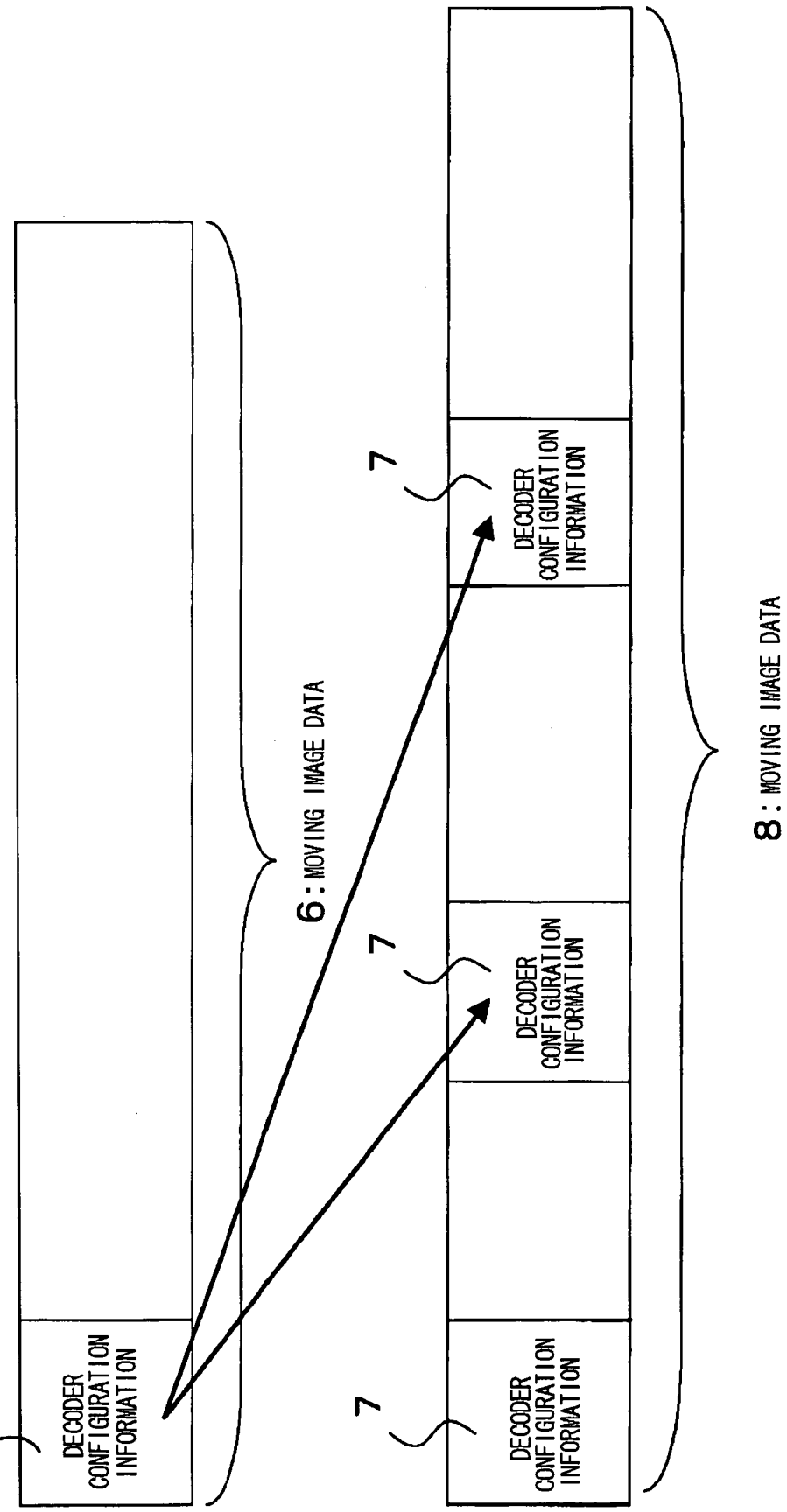
FIG. 2 is a diagram schematically showing how moving image data is converted.

Next, the following describes how the moving image data 6 is converted to the moving image data 8 in the moving image data conversion device 1. FIG. 2 is a diagram schematically showing how the moving image data is converted. Referring to FIG. 2, decoder configuration information 7 included in the moving image data 6 is retrieved and is inserted into multiple predetermined positions in the moving image data 6 for generating the moving image data 8. As a result, the decoder configuration information 7 included in the specific position in the moving image data 6 is present in the multiple positions in the moving image data 8.

In the decoder configuration information 7, information required for the decoder to reproduce moving image data is recorded. For example, various types of information such as the information on the specifications for decoding moving image data, the image size, and the time resolution are recorded. To reproduce the moving image data 6, the specific position in the moving image data 6, usually, the start position, must be accessed to retrieve the decoder configuration information 7 even if the user wants to reproduce the moving image data from an intermediate position. In contrast, to reproduce the moving image data 8, the information required for the decoder can be obtained by retrieving the decoder configuration information 7 in a predetermined position and therefore the moving image data 8 can be reproduced from an intermediate position. Except for retrieving and inserting the decoder configuration information 7, the moving image data is not processed. Therefore, the processing amount required for the conversion processing can be reduced.

Although the insertion position of the decoder configuration information 7 differs between the moving image data 6 and the moving image data 8 in the above description, the data of reproduced contents is the same. On the other hand, the moving image data 6 may be transcoded to generate the moving image data 8 in such a way that the decoder configuration information 7 is included in predetermined positions in the moving image data 6. Transcoding refers to the conversion of the image size, the coding rate, and time resolution of moving image data. In this case, the data of the reproduced contents may differ between the moving image data 6 and the moving image data 8. In this case, however, the decoder configuration information 7 included in the transcoded moving image data 8 must be changed according to the information compatible with the contents of transcoding.

Next, several embodiments will be described with reference to the drawings.

First Embodiment

Figure 3:
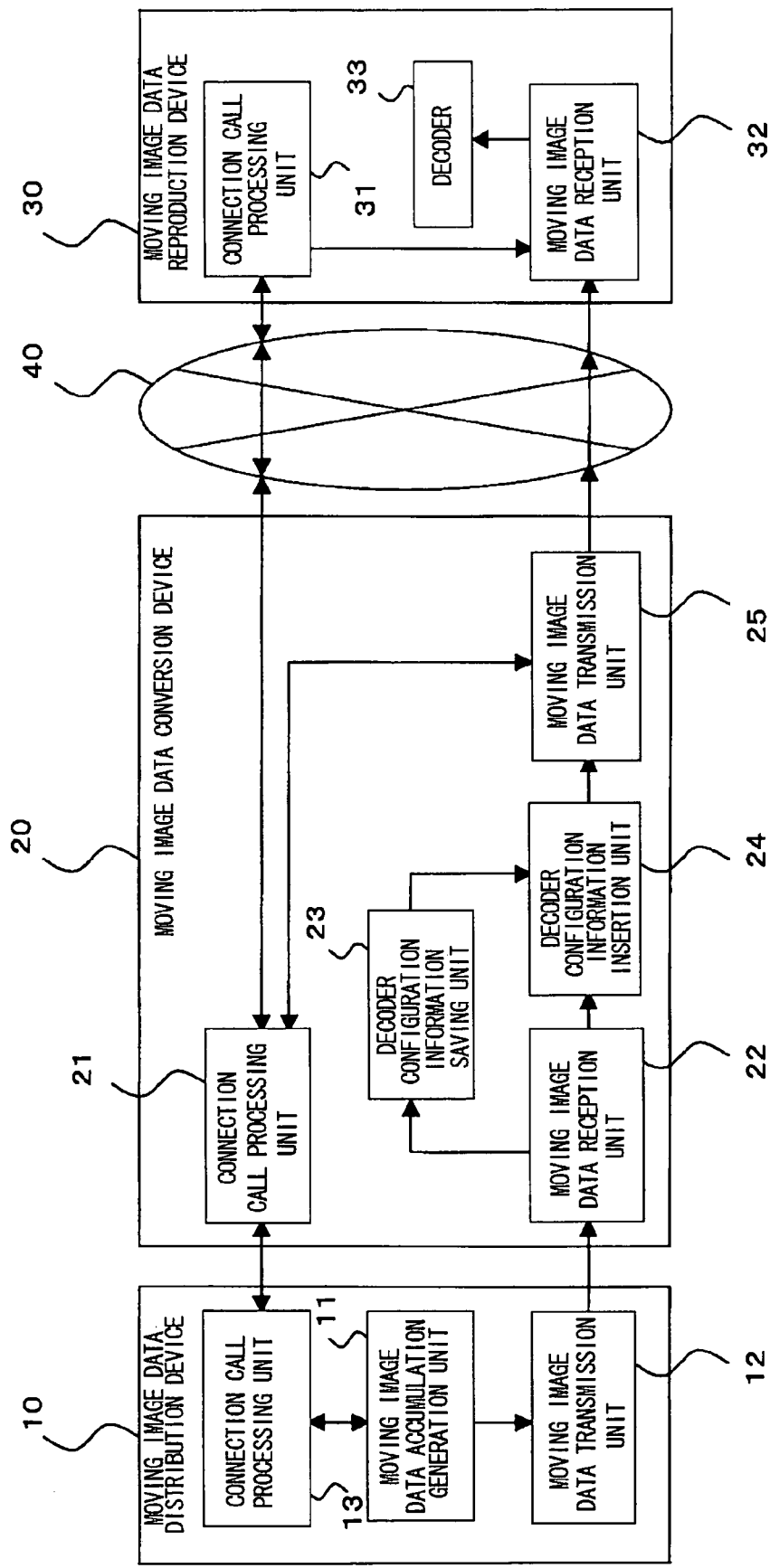
FIG. 3 is a diagram showing the configuration of a moving image data distribution system that uses moving image data conversion in a first embodiment of the present invention.

FIG. 3 is a diagram showing the configuration of a moving image data distribution system that uses moving image data conversion in a first embodiment of the present invention. As shown in FIG. 3, the whole system comprises a moving image data distribution device 10, a moving image data conversion device 20, a moving image data reproduction device 30, and a transmission line 40 for transmitting moving image data. The moving image data conversion device 20, connected to the transmission line 40 where an IP network is built, distributes moving image data via IP communication. The moving image data reproduction device 30 is a client terminal connected to the IP network. The moving image data conversion device 20 captures accumulated data or streaming data from the moving image data distribution device 10, converts the data, and supplies the converted data to the moving image data reproduction device 30 as streaming data.

The moving image data distribution device 10 comprises a moving image data accumulation generation unit 11, a moving image data transmission unit 12, and a connection call processing unit 13. The connection call processing unit 13 specifies moving image to be sent and its reproduction start position and sets a device, to which the moving image data is sent, based on the connection call processing with the moving image data conversion device 20 or on a specified pre-set transmission setting. The moving image data accumulation generation unit 11 generates moving image data that is accumulated in advance (accumulated data) or moving image data coded and generated in real time (streaming data) based on the specification of the connection call processing unit 13. The generated moving image data is transmitted from the moving image data transmission unit 12 to the moving image data conversion device 20, which is the transmission destination, via an IP network or predetermined transmission means.

The moving image data conversion device 20 comprises a connection call processing unit 21, a moving image data reception unit 22, a decoder configuration information saving unit 23, a decoder configuration information insertion unit 24, and a moving image data transmission unit 25. The connection call processing unit 21 sets the moving image data distribution device 10 that is the transmission source (sender) of the moving image data reception unit 22 that receives the moving image data, based on the connection call processing with the moving image data distribution device 10 and the moving image data reproduction device 30 or on the pre-set transmission setting. In addition, the connection call processing unit 21 sets the moving image data reproduction device 30 that is the destination to which the converted moving image data is sent.

The decoder configuration information saving unit 23 extracts and saves decoder configuration information (DCI) included in a specific position or the corresponding header information from moving image data received by the moving image data reception unit 22. For example, if the moving image data is coded in the MPEG-4 coding method, the DCI is present at the head of the moving image data.

The decoder configuration information insertion unit 24 inserts the decoder configuration information, saved by the decoder configuration information saving unit 23, before all pictures or I pictures (key frames). The moving image data transmission unit 25 sends the moving image data, in which the decoder configuration information is inserted, to the moving image data reproduction device 30, which is the device specified by the connection call processing unit 21, via the transmission line 40.

The moving image data reproduction device 30 comprises a connection call processing unit 31, a moving image data reception unit 32, and a decoder 33. The connection call processing unit 31 specifies moving image data to be sent and its reproduction start position and sets the destination device, to which the moving image data is sent, based on the connection call processing with the moving image data conversion device 20 or on the pre-set transmission setting. In addition, the moving image data reception unit 32 receives moving image data sent from the moving image data conversion device 20. The received moving image data is passed to the decoder 33.

The decoder 33 decodes and reproduces the moving image data. Because the decoder configuration information (DCI) or the corresponding header information is included at least before the I pictures, the received moving image data can be decoded from the first I picture after the reception starts. The moving image data, which is received before the decoder configuration information or an I picture is received, may be discarded by the decoder 33 or the moving image data reception unit 32 because the data cannot be decoded correctly.

That is, because the decoder configuration information is inserted in multiple predetermined positions in the moving image data, the moving image data can be decoded not only from its head but also from any desired position.

Although the moving image data reproduction device 30 performs connection call processing with the moving image data conversion device 20 in FIG. 3, it is also possible for the moving image data reproduction device 30 to perform the connection call processing with the moving image data distribution device 10 or with some other connection control device (not shown). A device for managing the directory of moving image data may also be used between them. That is, the moving image data reproduction device 30 is only required to transmit information on the moving image data to be reproduced and its reproduction position (transmission start position) directly or indirectly via some connection means to the moving image data distribution device 10 and, at the same time, to request the moving image data conversion device 20 to convert the obtained moving image data.

Figure 4:
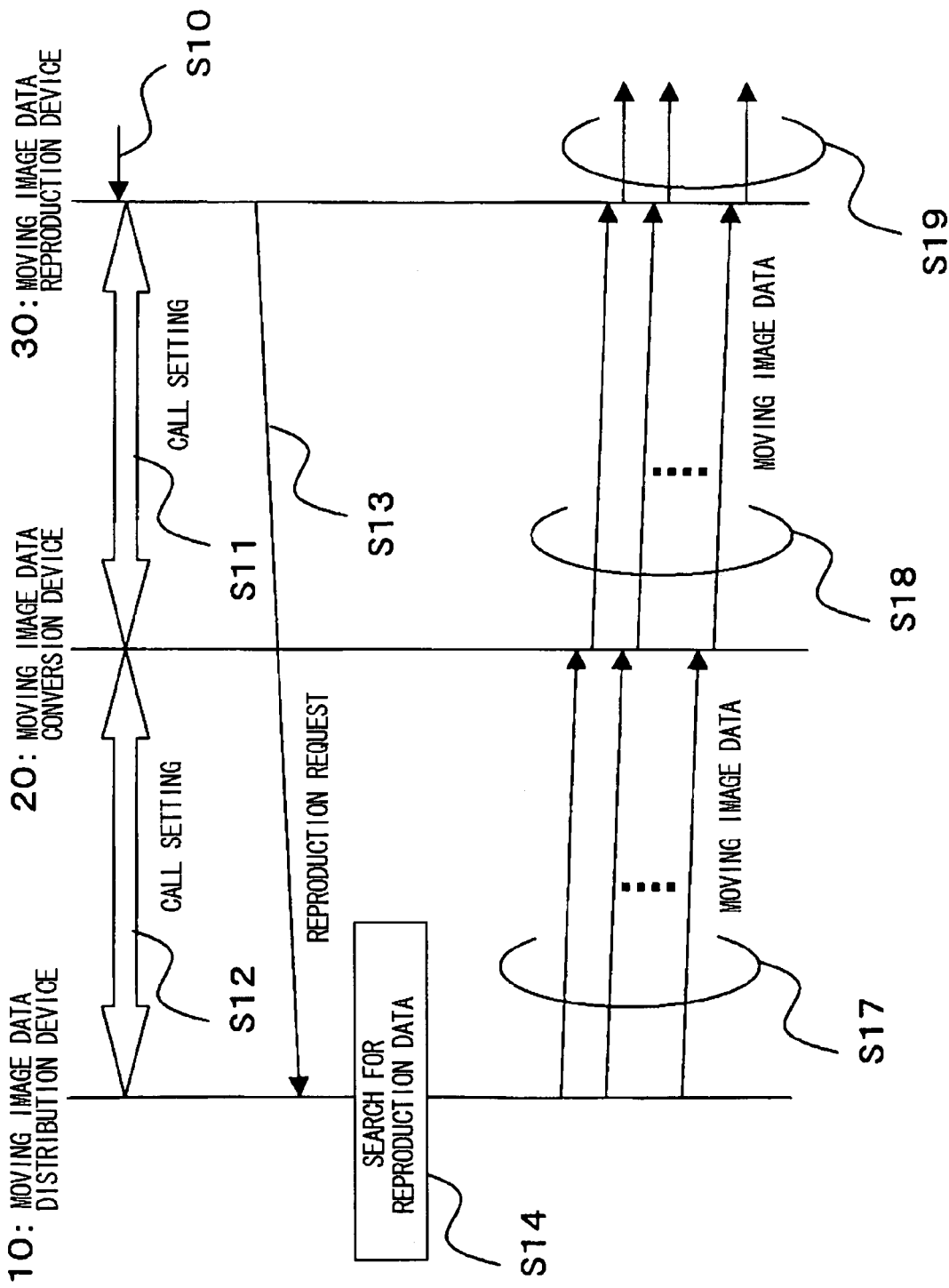
FIG. 4 is a diagram showing the sequence of communication between the devices in the first embodiment of the present invention.

Next, the sequence of communication between the devices will be described. FIG. 4 is a diagram showing the sequence of communication between the devices in the first embodiment of the present invention. In step S10, the moving image data reproduction device 30 specifies moving image data to be reproduced and its reproduction position. Usually, the user who wants to reproduce a moving image specifies them via some user interface.

In step S11, the connection call processing is performed between the moving image data reproduction device 30 and the moving image data conversion device 20 and a call is set. In addition, in step S12, the connection call processing is performed between the moving image data conversion device 20 and moving image data distribution device 10 and a call is set. The call setting information and the information sent and received between the devices via a path, set up by the call setting, are transmitted by a highly reliable protocol with the acknowledgement function such as TCP (Transmission Control Protocol).

In step S13, a reproduction request including the information on moving image data to be reproduced and its reproduction position is transmitted from the moving image data reproduction device 30 to the moving image data distribution device 10. Although FIG. 4 shows that the moving image data conversion device 20 does not relay the reproduction request, the moving image data conversion device 20 may relay the reproduction request. The information on the reproduction request is transmitted over TCP via the path that is set up by the call setting.

In step S14, the moving image data distribution device 10 searches for the moving image data to be reproduced and retrieves the decoder configuration information (DCI) or the corresponding header information of the moving image data. In addition, the moving image data distribution device 10 holds the reproduction position of the moving image data to be reproduced.

In step S17, the moving image data distribution device 10 sends the moving image data to be reproduced to the moving image data conversion device 20 serially beginning at the specified reproduction position.

In step S18, the moving image data conversion device 20 inserts the decoder configuration information (DCI) or the corresponding header information into the received moving image data and sends the generated new moving image data serially to the moving image data reproduction device 30.

In step S19, the moving image data reproduction device 30 serially decodes and reproduces the received moving image data.

Next, a packet of moving image data transmitted in step S17 and step S18 will be described. FIG. 5 is a diagram showing the structure of a packet of transmitted moving image data. FIG. 5 shows the structure of a packet, for example, when RTP(Real-time Transport Protocol)/UDP (User Datagram Protocol)/IP is used as a transmission protocol. The decoder configuration information insertion unit 24 checks the RTP payload part (moving image data) of a received moving image data packet 101 received by the moving image data reception unit 22 in step S17 and, if the VOP (Video Object Plane) header is included at the start (head) of each piece of picture data when the MPEG-4 coding method is used, inserts the decoder configuration information before the VOP header. Because the VOP header is followed by the picture type information, the decoder configuration information may be inserted only before an I picture based on this information. A transmission moving image data packet 102, in which the decoder configuration information is inserted, is sent from the moving image data transmission unit 25 in step S18. That is, the moving image data sent and received between the devices is transmitted by a low-reliability protocol with no acknowledgement function such as UDP with emphasis on real-time transmission and reception.

In this embodiment, the moving image data conversion device 20 searches for the picture head data, such as the VOP header, or the picture head data and the picture type information to obtain the position in which the decoder configuration information is inserted. Therefore, there is no need for decoding moving image data, and the required processing amount can be minimized.

In addition, though the reception start position of moving image data differs according to the receiving user of the moving image data when the moving image data is distributed in the multicast mode, all receivers can receive the decoder configuration information correctly and start its reproduction.

Although the transmission line 40 is configured as a single transmission line in the description above, it is of course possible that the transmission line 40 is configured as multiple transmission lines to allow connection call processing data and moving image data to be transmitted on separate transmission lines.

Although the moving image data distribution device 10 and the moving image data conversion device 20 are configured as separate devices connected via an IP network or specific means in the description above, those devices may be integrated into one device.

Second Embodiment

Figure 6:
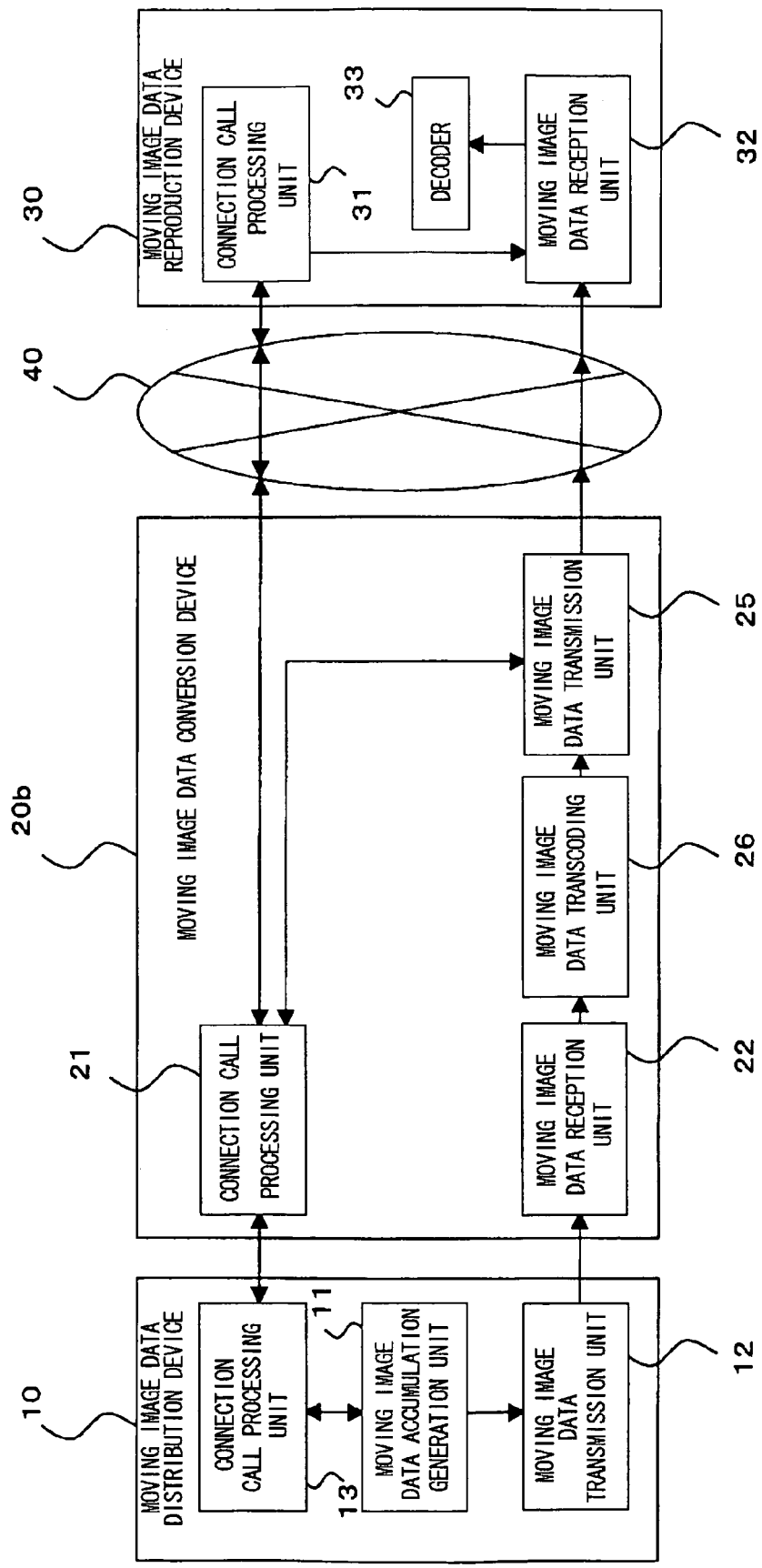
FIG. 6 is a diagram showing the configuration of a moving image data distribution system that uses moving image data conversion in a second embodiment of the present invention.

FIG. 6 is a diagram showing the configuration of a moving image data distribution system that uses moving image data conversion in a second embodiment of the present invention. As shown in FIG. 6, the whole system comprises a moving image data distribution device 10, a moving image data conversion device 20*b*, a moving image data reproduction device 30, and a transmission line 40 for transmitting moving image data. The moving image data distribution device 10, the moving image data reproduction device 30, and the transmission line 40 are the same as those described in the first embodiment and, therefore, their description is omitted.

The moving image data conversion device 20*b* captures accumulated data or streaming data from the moving image data distribution device 10, transcodes to covert the captured data, and supplies the transcoded data to the moving image data reproduction device 30 as streaming data. The moving image data conversion device 20*b* comprises a connection call processing unit 21, a moving image data reception unit 22, a moving image data transcoding unit 26, and a moving image data transmission unit 25. The connection call processing unit 21 sets a device, from which moving image data is received by the moving image data reception unit 22, based on connection call processing with the moving image data conversion device 20b [sic. "moving image data distribution device 10"] and the moving image data reproduction device 30 or on the pre-set transmission setting. In addition, the connection call processing unit 21 sets a destination device to which the converted moving image data is sent.

The moving image data transcoding unit 26 converts the received moving image data in such a way that the decoder configuration information (DCI) or the corresponding header information is inserted before the pictures or I pictures. At this time, the moving image data transcoding unit 26 may perform at least one of transcode processing at the same time, such as codec type conversion, moving image size conversion, bit rate conversion, frame rate conversion, trimming, filtering, and I picture interval change etc. When transcode processing is performed, the inserted decoder configuration information should be information compatible with the transcoded moving image data.

There are many methods for transcoding moving image data; for example, the moving image data is once decoded and then encoded again based on the setting of converted moving image data. Those methods are outside of the subject of the present invention and, therefore, the detailed description is omitted.

The moving image data transmission unit 25 sends the moving image data, which has been transcoded in such a way that the decoder configuration information is included in the predetermined multiple positions, to the moving image data reproduction device 30, specified by the connection call processing unit 21, via the transmission line 40.

Therefore, the moving image data reproduction device 30 that receives the moving image data can reproduce the moving image data not only from the head of the transcoded moving image data but also from any desired position.

The decoder 33 decodes and reproduces the moving image data. Because the decoder configuration information (DCI) or the corresponding header information is included at least before the I pictures, the received moving image data can be decoded from the first I picture after the reception starts. The moving image data, which is received before the decoder configuration information and an I picture are received, may be discarded by the decoder 33 or the moving image data reception unit 32 because the moving image data cannot be decoded correctly.

Although the moving image data reproduction device 30 performs connection call processing with the moving image data conversion device 20b in FIG. 6, it is also possible for the moving image data reproduction device 30 to perform the connection call processing with the moving image data distribution device 10 or with some other moving image data information distribution device (not shown).

In this embodiment, it is of course possible that the transmission line is configured as multiple transmission lines to allow connection call processing data and moving image data to be transmitted on separate transmission lines.

In addition, though the moving image data distribution device 10 and the moving image data conversion device 20b are configured as separate devices connected via an IP network or specific means in this embodiment, those devices may be integrated into one device.

Third Embodiment

Figure 7:
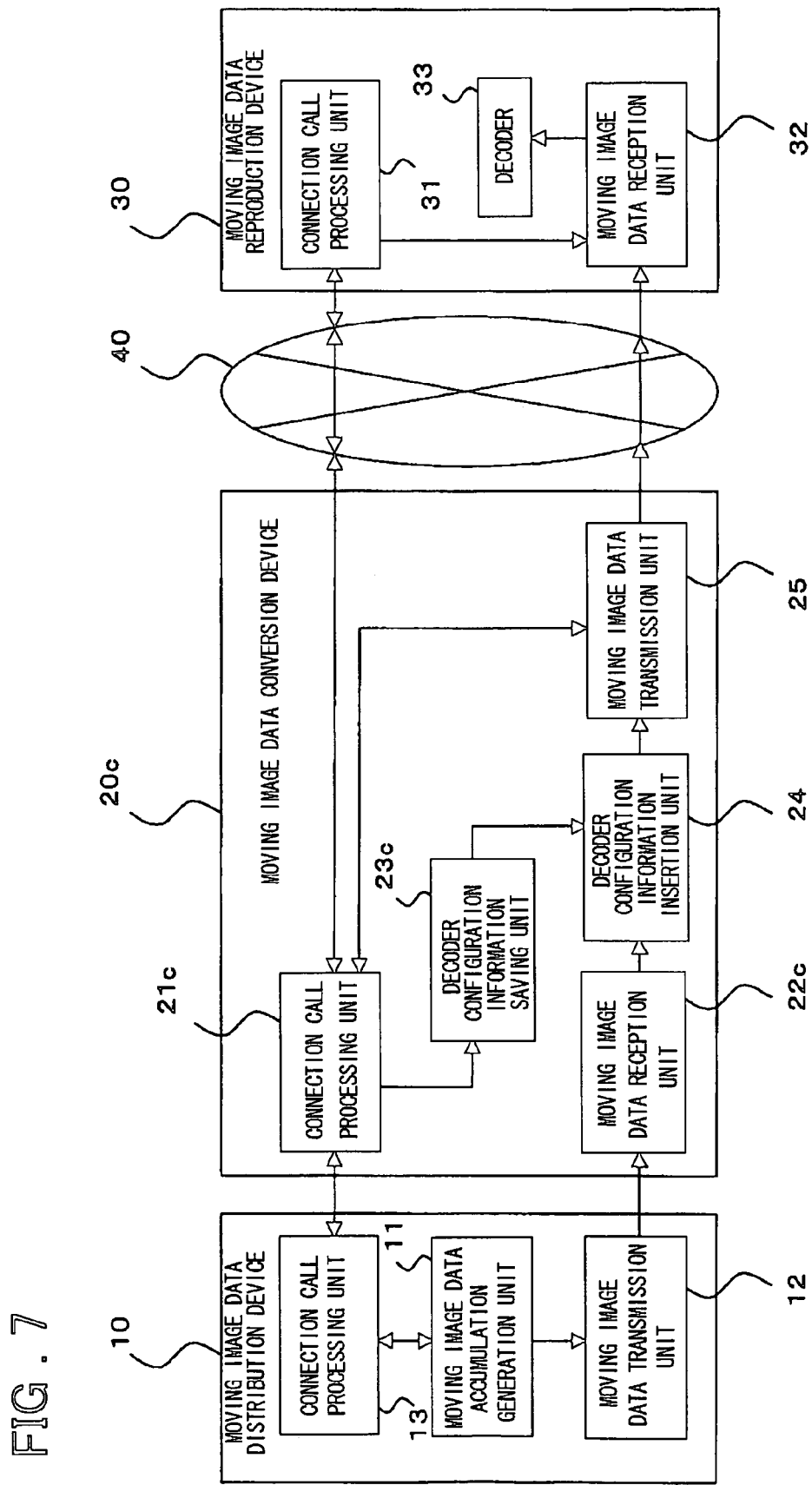
FIG. 7 is a diagram showing the configuration of a moving image data distribution system that uses moving image data conversion in a third embodiment of the present invention.

FIG. 7 is a diagram showing the configuration of a moving image data distribution system that uses moving image data conversion in a third embodiment of the present invention. As shown in FIG. 7, the whole system comprises a moving image data distribution device 10, a moving image data conversion device 20c, a moving image data reproduction device 30, and a transmission line 40 for transmitting moving image data. The moving image data distribution device 10, the moving image data reproduction device 30, and the transmission line 40 are the same as those described in the first embodiment and, therefore, their description is omitted.

The moving image data conversion device 20c captures and converts accumulated data or streaming data from the moving image data distribution device 10 and supplies the converted data to the moving image data reproduction device 30 as streaming data. The moving image data conversion device 20c comprises a connection call processing unit 21c, a moving image data reception unit 22c, a decoder configuration information saving unit 23c, a decoder configuration information insertion unit 24, and a moving image data transmission unit 25. The connection call processing unit 21c sets a device, from which moving image data is received by the moving image data reception unit 22c, based on connection call processing with the moving image data conversion device 20c and the moving image data reproduction device 30 or on the pre-set transmission setting. In addition, the connection call processing unit 21 sets a destination device to which the converted moving image data is sent. In addition, the connection call processing unit 21c receives the decoder configuration information on the moving image data, which will be decoded, from the moving image data distribution device 10 and supplies it to the decoder configuration information saving unit 23c. The decoder configuration information saving unit 23c saves the decoder configuration information (DCI) supplied from the connection call processing unit 21c or the corresponding header information.

The decoder configuration information insertion unit 24 inserts the decoder configuration information, saved by the decoder configuration information saving unit 23c, before (or preceding) all pictures or I pictures (key frames). The moving image data transmission unit 25 sends the moving image data, in which the decoder configuration information is inserted, to the moving image data reproduction device 30, which is the device specified by the connection call processing unit 21c, via the transmission line 40.

Figure 8:
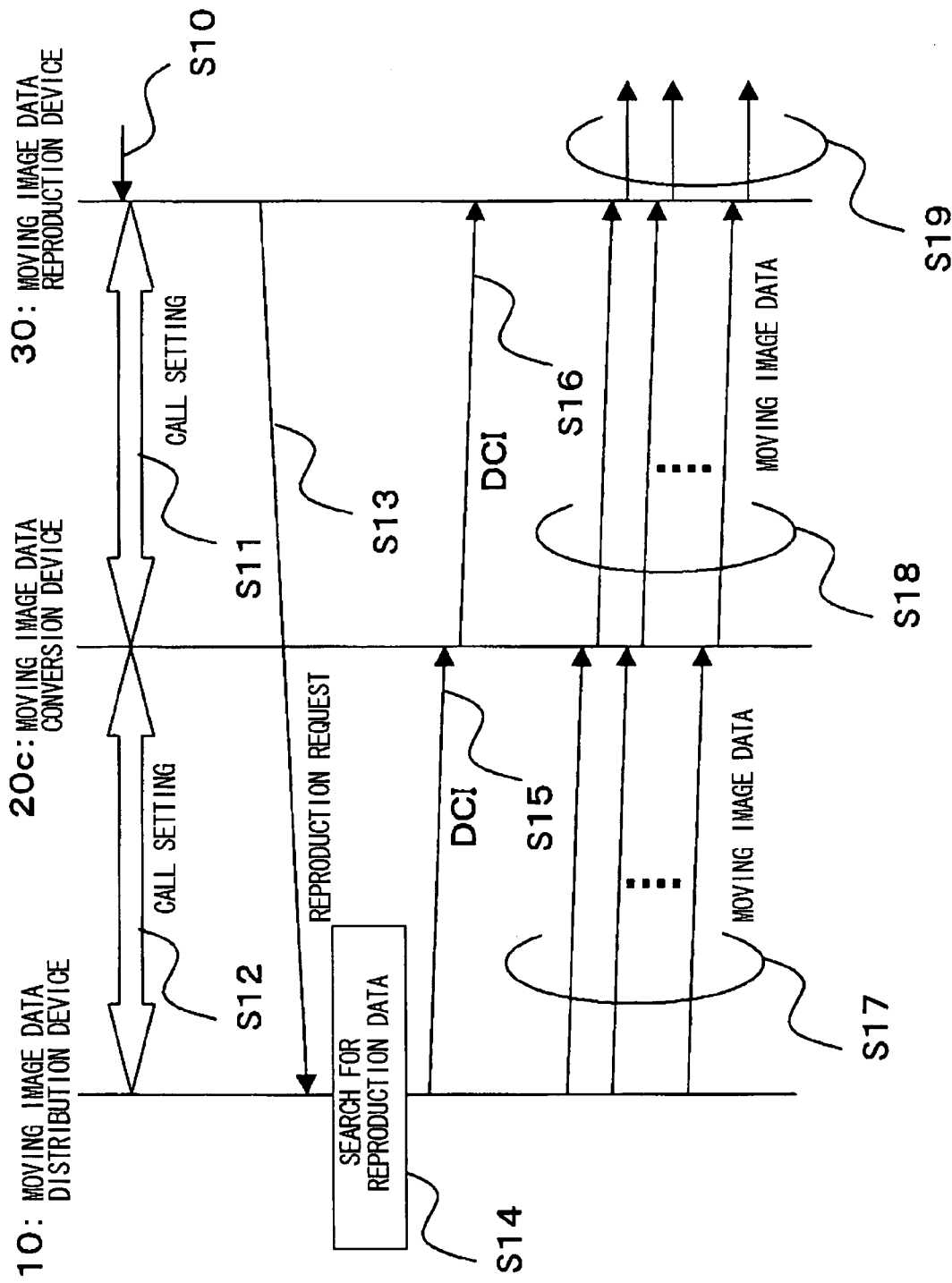
FIG. 8 is a diagram showing the sequence of communication between the devices in the third embodiment of the present invention.

Next, the sequence of communication between the devices will be described. FIG. 8 is a diagram showing the sequence of communication between the devices in the third embodiment of the present invention. Steps S10-S14 and S17-S19 are the same as those in FIG. 4 and, therefore, the description is omitted.

In step S15, the moving image data distribution device 10 sends the decoder configuration information (DCI) or the corresponding header information to the moving image data conversion device 20c. The decoder configuration information is transmitted between the connection call processing unit 13 and the connection call processing unit 21c over TCP.

In step S16, the moving image data conversion device 20c holds the transmitted decoder configuration information (DCI) or the corresponding header information and, at the same time, sends it to the moving image data reproduction device 30. The decoder configuration information is transmitted between the connection call processing unit 21c and the connection call processing unit 31 over TCP.

This embodiment differs from the first embodiment in that the moving image data conversion device 20c is configured described above and the decoder configuration information is obtained via the connection call processing unit 21c. The protocol used for the call processing is executed by a method that ensures higher reliability during data transmission, for example, a protocol such as TCP that retransmits data when an error occurs is used as described above or a response corresponding to Ack is sent. On the other hand, a less complex and reliable protocol such as UDP is used for transmitting moving image data to reduce the (upstream) traffic or to maintain real-time transmission. For example, even if a data error occurs on a transmission line such as a wireless transmission line, an error is not corrected in many cases. Therefore, transmitting the decoder configuration information via the protocol used for the call processing can increase the reliability of the decoder configuration information and prevent an abnormality such as a decoding failure at decoding time. That is, there is sometimes a case in which a data error occurs on the transmission line and, as a result, the decoder configuration information received by the moving image data conversion device 20c and the moving image data reproduction device 30 is different from the decoder configuration information embedded in the moving image data. Thus, this embodiment differs from the first embodiment in that, when a mismatch occurs in the decoder configuration information, this embodiment has a mechanism in which priority is placed on the decoder configuration information transmitted via a more reliable transmission line.

Fourth Embodiment

Figure 9:
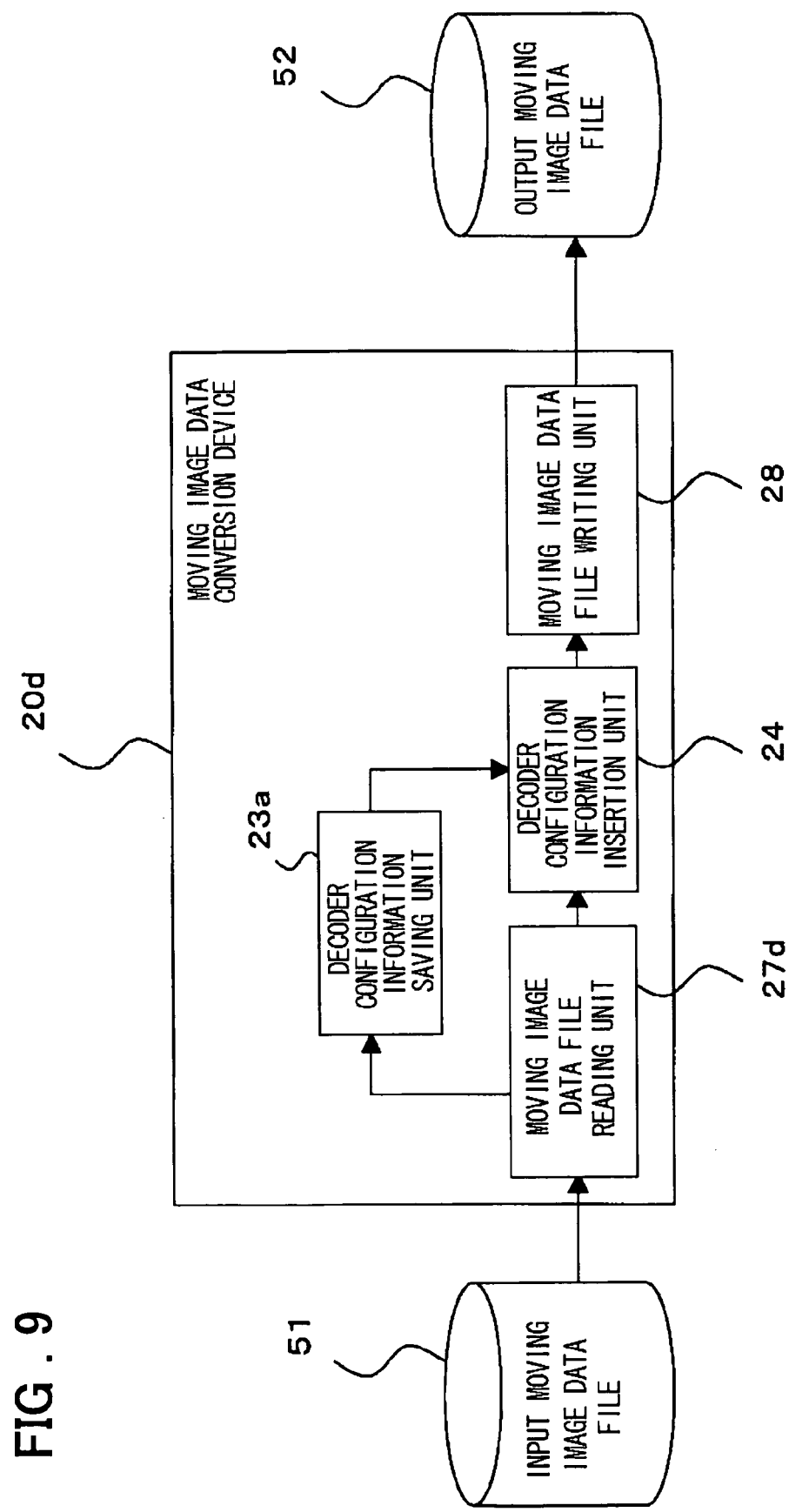
FIG. 9 is a diagram showing the configuration of a moving image data conversion system that uses moving image data conversion in a fourth embodiment of the present invention.

FIG. 9 is a diagram showing the configuration of a moving image data conversion system that uses moving image data conversion in a fourth embodiment of the present invention. As shown in FIG. 9, the whole system comprises a moving image data conversion device 20d, an input moving image data file 51, and an output moving image data file 52. The moving image data conversion device 20d converts the input moving image data file 51 that stores accumulated data to the output moving image data file 52 that stores accumulated data.

The moving image data conversion device 20d reads the input moving image data file 51 via a moving image data file reading unit 27d.

A decoder configuration information saving unit 23a extracts and saves decoder configuration information (DCI) or the corresponding header information included in a specific position, for example, at the start of the moving image data that is read.

A decoder configuration information insertion unit 24 inserts the decoder configuration information, saved by the decoder configuration information saving unit 23a, into predetermined multiple positions. A moving image file writing unit 28 outputs the moving image data, in which the decoder configuration information is inserted, as the output moving image data file 52.

Next, the following describes the structure of the input moving image data file 51 and the output moving image data file 52. FIG. 10 is a diagram showing the structure of moving image data before and after the conversion in the fourth embodiment. Referring to FIG. 10, the input moving image data file 51 before the conversion has the decoder configuration information at the start. In contrast, the output moving image data file 52 after the conversion has the decoder configuration information inserted before the I pictures.

In FIG. 9, the decoder configuration information insertion unit 24 checks the structure of the data in the input moving image data file 51 that is read by the moving image data file reading unit 27d, finds the head position of the picture data using a method for searching for the head data of pictures such as the VOP header, and inserts the decoder configuration information head of picture data. In this case, it is also possible to use the picture type information, which follows the head data of a picture, to insert the decoder configuration information only ahead of the I pictures. FIG. 10 shows a case in which the decoder configuration information is inserted only before the I pictures.

In this embodiment, the moving image data conversion device 20d searches for the head of each of pictures, or I pictures, to obtain the positions in which decoder configuration information is to be inserted. Therefore, there is no need for decoding the moving image data, and the processing amount required for the conversion can be minimized. The output moving image data file 52, output by the moving image data conversion device 20d, is a file in which the decoder configuration information is inserted in the predetermined multiple positions. Therefore, when the output moving image data file 52 is reproduced, the file may be reproduced not only from the head of the moving image data but also any desired position.

Fifth Embodiment

Figure 11:
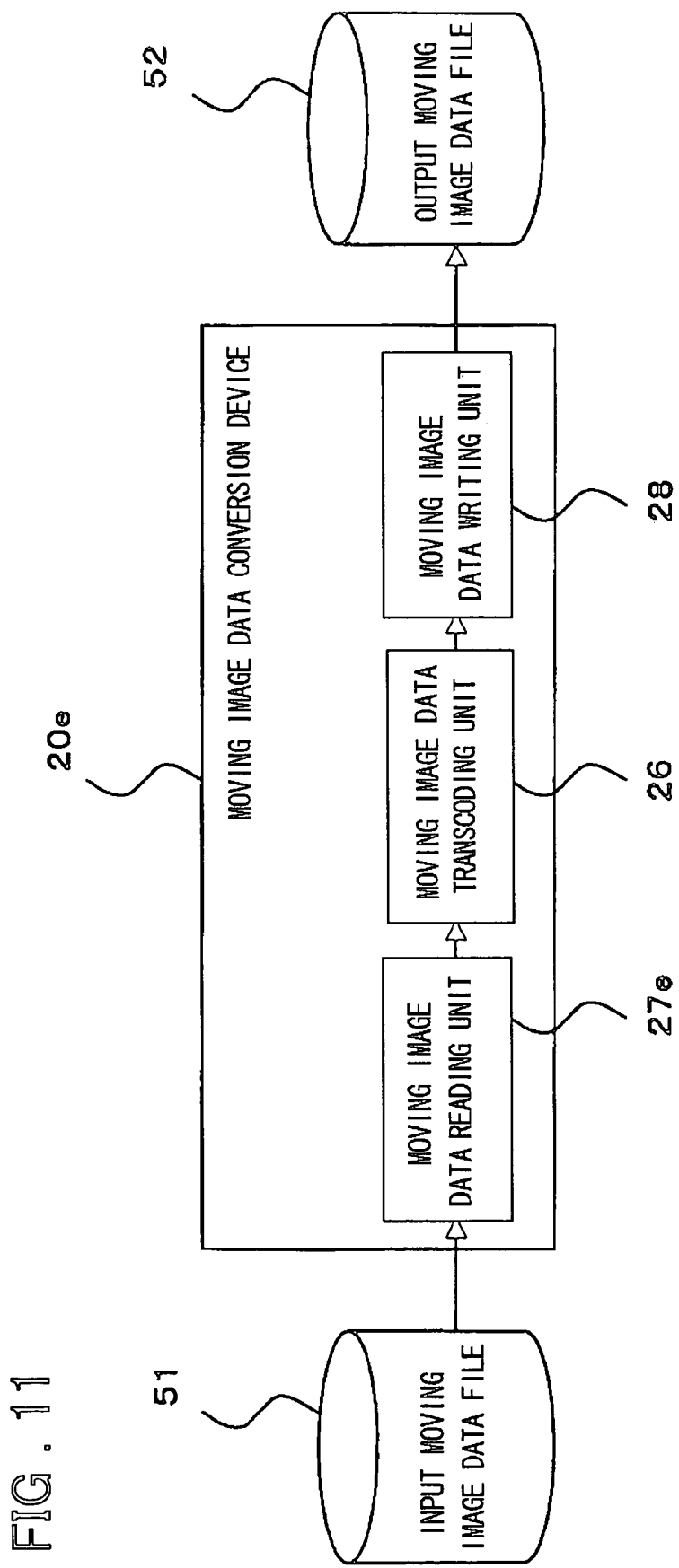
FIG. 11 is a diagram showing the configuration of a moving image data conversion system that uses moving image data conversion in a fifth embodiment of the present invention.

FIG. 11 is a diagram showing the configuration of a moving image data conversion system that uses moving image data conversion in a fifth embodiment of the present invention. As shown in FIG. 11, the whole system comprises a moving image data conversion device 20e, an input moving image data file 51, and an output moving image data file 52. The moving image data conversion device 20e transcodes to convert the input moving image data file 51 that stores accumulated data to the output moving image data file 52 that stores accumulated data.

The moving image data conversion device 20e reads the input moving image data file 51 via a moving image data (file) reading unit 27e.

A moving image data (file) transcoding unit 26 converts the moving image data, which is read, in such a way that decoder configuration information (DCI) or the corresponding header information is inserted before each of the pictures or I pictures. At this time, the moving image data transcoding unit 26 may perform at least one of transcode processing at the same time, such as CODEC type conversion, moving image size conversion, bit rate conversion, frame rate conversion, trimming, filtering, and I picture interval change etc. The decoder configuration information in this case is information compatible with the transcoded moving image data.

There are many methods for transcoding moving image data; for example, the moving image data is once decoded and then re-encoded based on the setting of the transcoded moving image data. The description of those methods is outside the subject of the present invention and, therefore, the detailed description is omitted.

A moving image file writing unit 28 outputs the moving image data, in which the decoder configuration information is inserted and which is transcoded, as the output moving image data file 52.

The output moving image data file 52 is a file in which the decoder configuration information is inserted in the predetermined multiple positions and which is transcoded. Therefore, when the output moving image data file 52 is reproduced, the file may be reproduced not only from the head of the moving image data but also any desired position.

Sixth Embodiment

Figure 12:
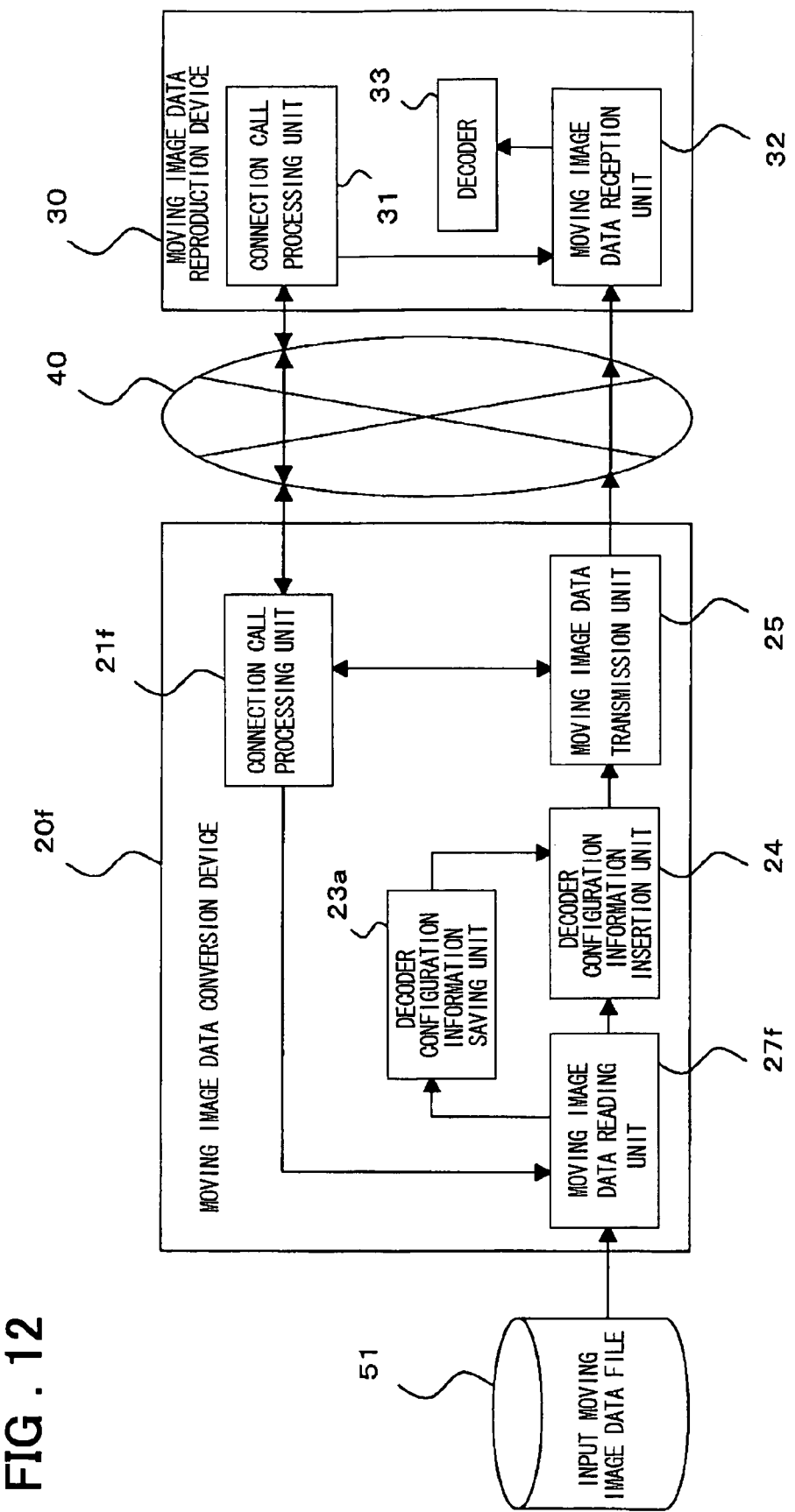
FIG. 12 is a diagram showing the configuration of a moving image data distribution system that uses moving image data conversion in a sixth embodiment of the present invention.

FIG. 12 is a diagram showing the configuration of a moving image data distribution system that uses moving image data conversion in a sixth embodiment of the present invention. As shown in FIG. 12, the whole system comprises an input moving image data file 51, a moving image data conversion device 20f, a moving image data reproduction device 30, and a transmission line 40 for transmitting moving image data. The moving image data reproduction device 30 and the transmission line 40 are the same as those described in the first embodiment and, therefore, their description is omitted.

The moving image data conversion device 20f converts the input moving image data file 51, which stores accumulated data, and supplies the converted data to the moving image data reproduction device 30 as streaming data. The moving image data conversion device 20f comprises a connection call processing unit 21f, a moving image data reading unit 27f, a decoder configuration information saving unit 23a, a decoder configuration information insertion unit 24, and a moving image data transmission unit 25. The connection call processing unit 21f sets a device, which is the transmission destination of the converted moving image data, based on connection call processing with the moving image data reproduction device 30 or on the pre-set transmission setting. In addition, the moving image data conversion device 20f obtains the decoder configuration information on the moving image data, which is converted, from the input moving image data file 51 read via the moving image data reading unit 27f and supplies the decoder configuration information to the decoder configuration information saving unit 23a.

The moving image data conversion device 20 shown in FIG. 3 obtains moving image data from the moving image data distribution device 10, while the moving image data conversion device 20f obtains moving image data from the input moving image data file 51. This is the point where this embodiment differs from the first embodiment.

Seventh Embodiment

Figure 13:
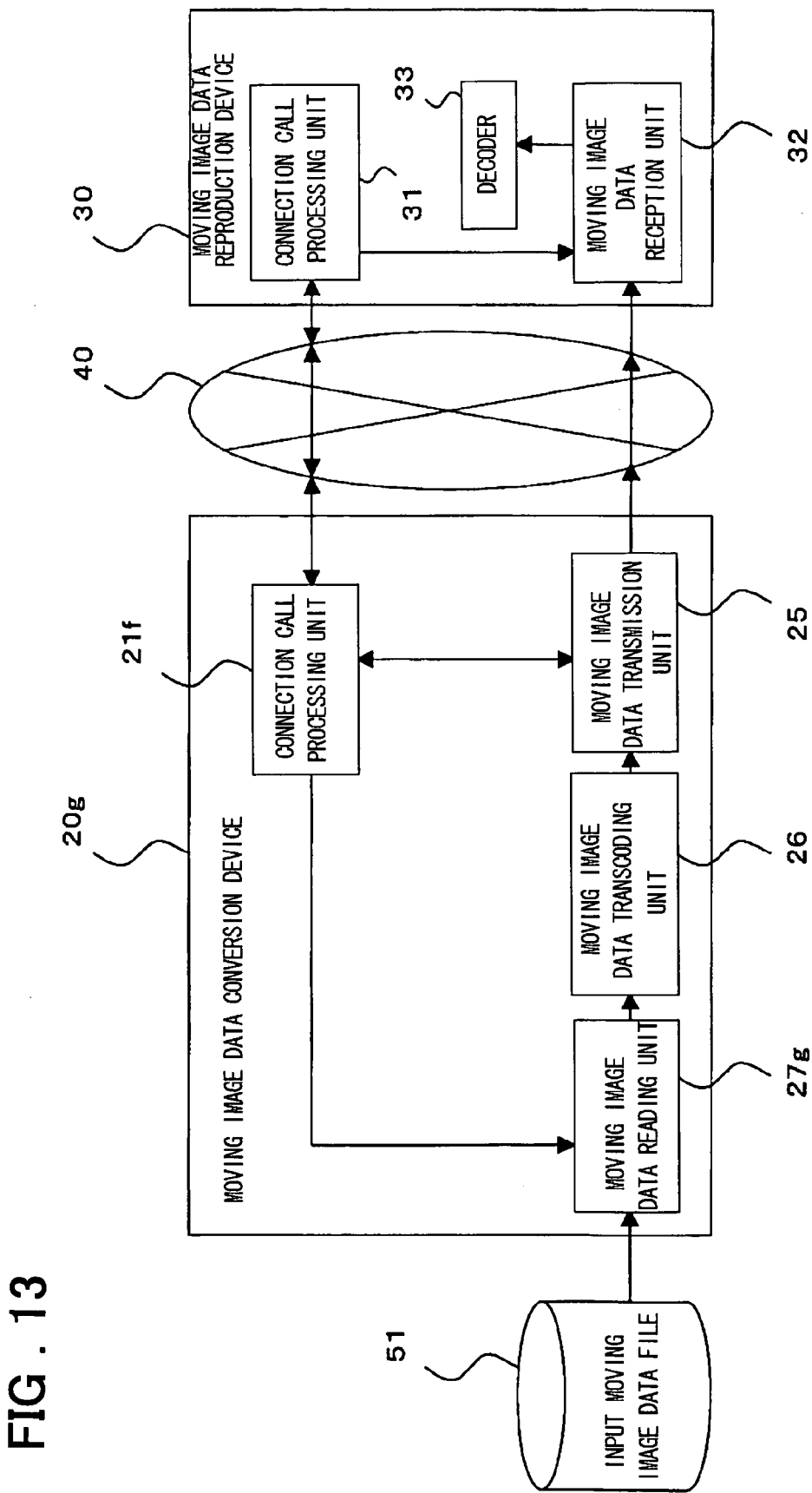
FIG. 13 is a diagram showing the configuration of a moving image data distribution system that uses moving image data conversion in a seventh embodiment of the present invention.

FIG. 13 is a diagram showing the configuration of a moving image data distribution system that uses moving image data conversion in a seventh embodiment of the present invention. As shown in FIG. 13, the whole system comprises an input moving image data file 51, a moving image data conversion device 20g, a moving image data reproduction device 30, and a transmission line 40 for transmitting moving image data. The moving image data reproduction device 30 and the transmission line 40 are the same as those described in the first embodiment and, therefore, their description is omitted.

The moving image data conversion device 20g transcodes to convert the input moving image data file 51, which stores accumulated data, and supplies the data to the moving image data reproduction device 30 as streaming data. The moving image data conversion device 20g comprises a connection call processing unit 21f, a moving image data reading unit 27g, a moving image data transcoding unit 26, and a moving image data transmission unit 25. The connection call processing unit 21f sets a device that is the destination, to which the converted moving image data is sent, based on connection call processing with the moving image data reproduction device 30 or on the pre-set transmission setting. In addition, the connection call processing unit 21f obtains decoder configuration information on the moving image data, which is converted, from the input moving image data file 51 read via the moving image data reading unit 27g.

The moving image data conversion device 20b shown in FIG. 6 obtains moving image data from the moving image data distribution device 10, while the moving image data conversion device 20g obtains moving image data from the input moving image data file 51. This is the point where this embodiment differs from the second embodiment.

Eighth Embodiment

Figure 14:
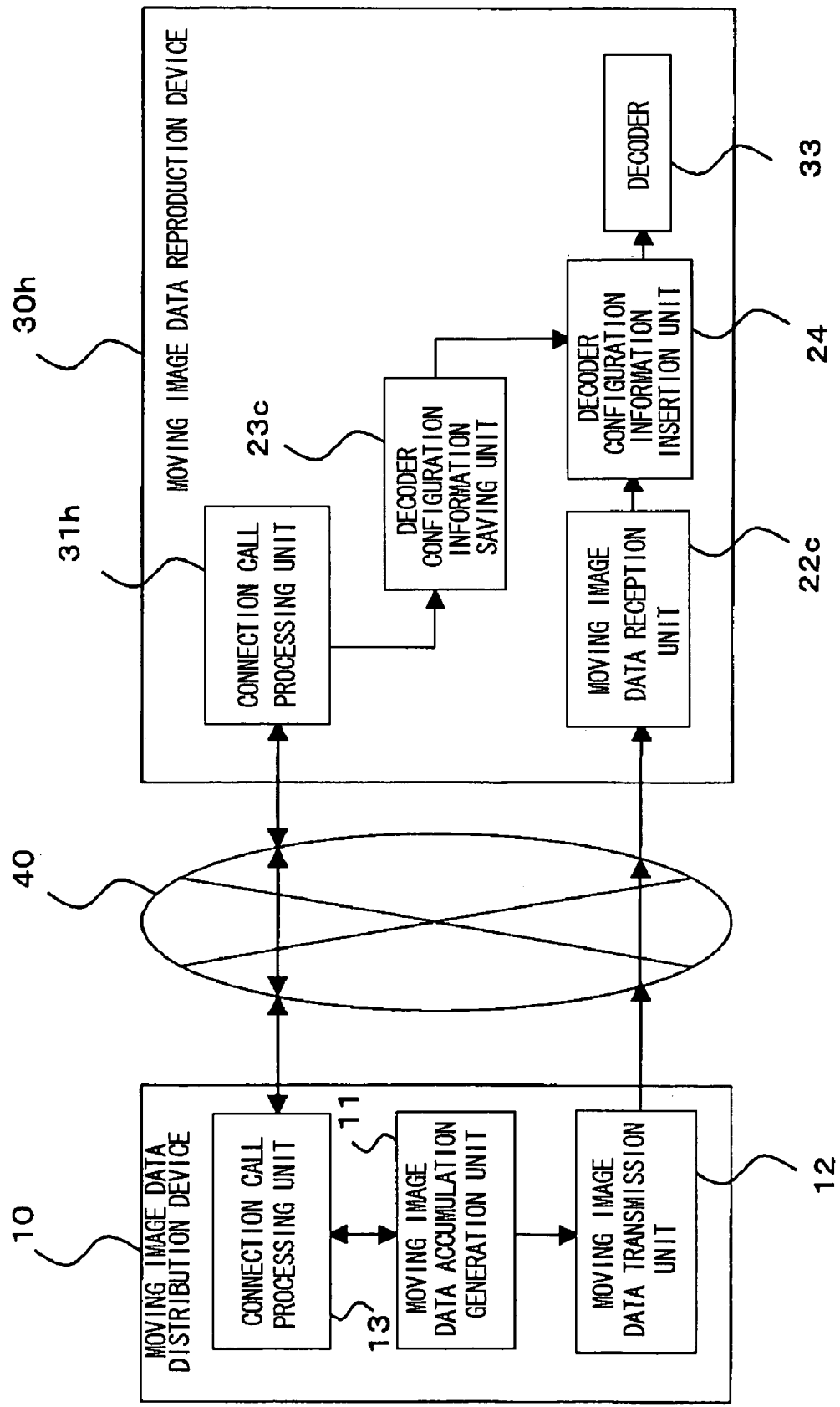
FIG. 14 is a diagram showing the configuration of a moving image data distribution system that uses moving image data conversion in an eighth embodiment of the present invention.

FIG. 14 is a diagram showing the configuration of a moving image data distribution system that uses moving image data conversion in an eighth embodiment of the present invention. As shown in FIG. 14, the whole system comprises a moving image data distribution device 10, a moving image data reproduction device 30h, and a transmission line 40 for transmitting moving image data. The moving image data distribution device 10 and the transmission line 40 are the same as those described in the first embodiment and, therefore, their description is omitted.

The moving image data reproduction device 30h captures accumulated data or streaming data, converts it, and reproduces it. The moving image data reproduction device 30h comprises a connection call processing unit 31h, a moving image data reception unit 22c, a decoder configuration information saving unit 23c, a decoder configuration information insertion unit 24, and a decoder 33. The moving image data reproduction device 30h is a device equivalent to the moving image data reproduction device 30 to which the function of the moving image data conversion device 20c in the third embodiment is moved.

Ninth Embodiment

Figure 15:
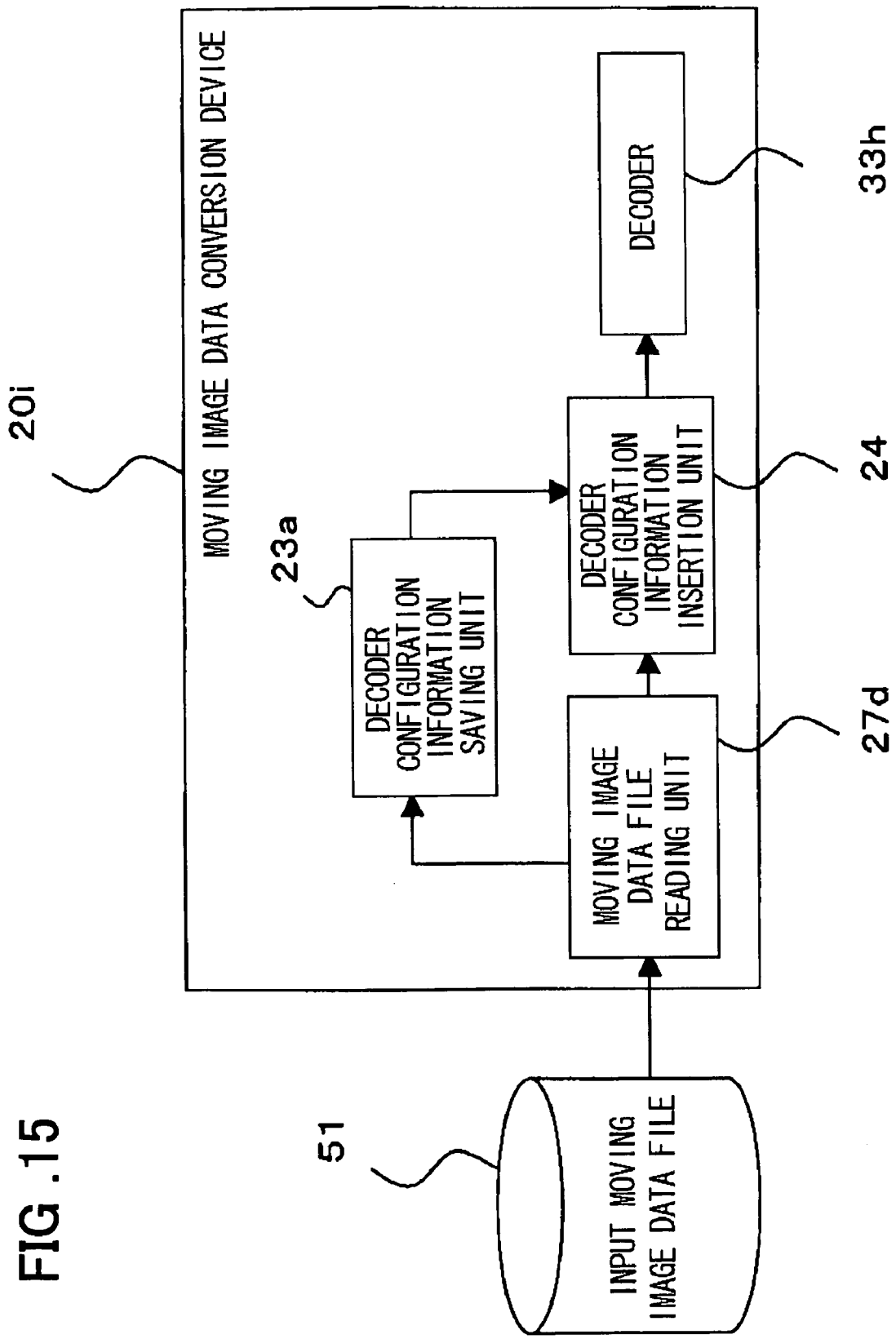
FIG. 15 is a diagram showing the configuration of a moving image data conversion system that uses moving image data conversion in a ninth embodiment of the present invention.

FIG. 15 is a diagram showing the configuration of a moving image data conversion system that uses moving image data conversion in a ninth embodiment of the present invention. As shown in FIG. 15, the system comprises an input moving image data file 51 and a moving image data conversion device 20i. The moving image data conversion device 20i is a device for reproducing the input moving image data file 51 that stores accumulated data.

The moving image data conversion device 20i corresponds to a combination of the moving image data conversion device 20f and the moving image data reproduction device 30, shown in FIG. 12, from which the transmission part between them, that is, the connection call processing unit 21f, the moving image data transmission unit 25, the transmission line 40, the connection call processing unit 31, and the moving image data reception unit 32, is removed. Therefore, the input moving image data file 51, which is locally provided, can be reproduced.

Although IP is used as the transmission protocol between the devices and MPEG-4 is used as the moving image data coding method in the embodiments described above, it is apparent that, in accordance with the present invention, the transmission protocol is not limited to IP and that the moving image data coding method is not limited to MPEG-4.

The invention claimed is:

1. A moving image data reproduction device comprising:
   means for receiving transmission source information on moving image data from an external device;
   means for selecting a moving image data conversion device based on the transmission source information and receiving the moving image data that is output;
   means for decoding and reproducing the received moving image data; and
   means for receiving decoder configuration information from an external device, wherein the decoder configuration information is used as decoder configuration information for decoding the received moving image data;

wherein the moving image data conversion device comprises:

receiving means for receiving first moving image data;

transcoding means, for use when the first moving image data is transcoded to generate second moving image data, for changing decoder configuration information, included in the first moving image data to define a condition for decoding the first moving image data, to decoder configuration information to define a condition for decoding the second moving image data followed by generating the second moving image data in such a way that the changed decoder configuration information is included in at least one predetermined position in the second moving image data; and output means for outputting the second moving image data wherein, after the decoder configuration information is passed to a decoder, the moving image data to the start of a key frame is discarded within the decoder or before arrival to the decoder.

2. A moving image data reproduction device comprising:

means for receiving transmission source information on moving image data from an external device;

means for selecting a moving image data conversion device based on the transmission source information and receiving the moving image data that is output;

means for decoding and reproducing the received moving image data; and means for receiving decoder configuration information from an external device, wherein the decoder configuration information is used as decoder configuration information for decoding the received moving image data, and wherein at least two types of path are provided for communication with said external device with a first type of path set up more reliable than a second type of path and the decoder configuration information is received via the first type of path through communication with said external device;

wherein, after the decoder configuration information is passed to a decoder, the moving image data to the start of a key frame is discarded within the decoder or before arrival to the decoder; and wherein the moving image data conversion device comprises:

receiving means for receiving first moving image data;

transcoding means, for use when the first moving image data is transcoded to generate second moving image data, for changing decoder configuration information, included in the first moving image data to define a condition for decoding the first moving image data, to decoder configuration information to define a condition for decoding the second moving image data followed by generating the second moving image data in such a way that the changed decoder configuration information is included in at least one predetermined position in the second moving image data; and output means for outputting the second moving image data.

* * * * *